United States Patent [19]
Aizawa et al.

[11] Patent Number: 5,928,762
[45] Date of Patent: Jul. 27, 1999

[54] LAMINATE OF A BASE MATERIAL AND AN EMBOSSED SHEET

[75] Inventors: Tetsuo Aizawa; Masahiro Yamazoe; Ikuma Nishimura; Kazuhiko Ohta, all of Taito-ku; Toshio Inoue, Kawasaki; Tokuhito Suzuki, Ohta-ku, all of Japan

[73] Assignees: Toppan Printing Co., Ltd; Nippon Petrochemicals Company, Limited, both of Tokyo, Japan

[21] Appl. No.: 08/716,576

[22] Filed: Sep. 19, 1996

[30] Foreign Application Priority Data

Sep. 22, 1995 [JP] Japan ..................................... 7-269205

[51] Int. Cl.⁶ ...................................................... B32B 3/00
[52] U.S. Cl. ........................... 428/156; 428/516; 428/523; 525/240; 525/322
[58] Field of Search .................................... 428/516, 523, 428/156

[56] References Cited

U.S. PATENT DOCUMENTS 5,252,379  10/1993  Kuribayashi et al. .................. 428/141
5,358,785  10/1994  Akao et al. ............................. 428/349

FOREIGN PATENT DOCUMENTS 3-244539  10/1991  Japan .
6-016832   1/1994  Japan .
7-080997   3/1995  Japan .
7-126460   5/1995  Japan .
7-156460   5/1995  Japan .

OTHER PUBLICATIONS

Hawley et al. "Hawley's Condensed Chemical Dictionary", 9th edition, p. 935, 1987.

*Primary Examiner*—David W. Wu
*Attorney, Agent, or Firm*—Scully, Scott, Murphy & Presser

[57] ABSTRACT

An embossed sheet which is excellent in embossing properties, whitening resistance and transparency, can be prepared by using a resin composition containing specific ratios of (A) polypropylene having a specific melting point of 125° C. or higher, (B) ethylene-α-olefin copolymer having specific properties and (C) random copolymer of aromatic vinyl compound and conjugated diene compound having specific properties. Further, the present invention provides the laminates which is made using the above embossed sheet and the method for producing them.

10 Claims, 1 Drawing Sheet

LAMINATE OF A BASE MATERIAL AND AN EMBOSSED SHEET

BACKGROUND OF THE INVENTION (1) Field of the Invention

The present invention relates to an embossed sheet which is prepared by embossing a transparent sheet with some patterns. The transparent sheet used for this purpose in the present invention comprises a specific polyolefin resin composition and has excellent workability in embossing operation in easiness in the formation of embossing patterns and the durability of embossing patterns at high temperatures. The invention further relates to the laminate of the embossed sheet and a method for producing them. The term "sheet" hereinafter referred to includes "film" and the like.

(2) Prior Art

The materials made of polyvinyl chloride have been used as decorative material, interior wall material and the like made by using an embossed sheet having decorative patterns. However, because of the trouble of generating noxious gases when they are incinerated, embossed sheet made of polyolefin resin are recently used in place of them. The polyolefin embossed sheet is excellent in appearance and workability in manufacturing and the field of its uses expanded recently and the demands for the more agreeable appearance increased. It is, however, considered that the polyolefin embossed sheet is not always satisfactory in the following points:

(1) Stability in the wide variety of changes of environmental temperature, (2) Adaptability for embossing with complicated patterns, in other words, workability in embossing, (3) Resistance to whitening in a secondary processing or when it is subjected to shocks, in the case that the thickness of sheet is increased in order to form deep embossing patterns, and (4) Good transparency or other property.

It is, therefore, the object of the present invention to provide a polyolefin embossed sheet which is free from the above problems and which also maintains proper balances among the characteristic features of conventional ones such as softness, transparency, yield strength, and scratch resistance (surface hardness). The object of the present invention is to provide also the laminate made by using the embossed sheet and a method for producing the laminate by effectively taking advantage of the excellent workability in the embossing process of sheet materials.

BRIEF SUMMARY OF THE INVENTION

The first aspect of the present invention relates to an embossed sheet prepared by embossing one or both surfaces of a polyolefin resin sheet made of a resin composition which is characterized in that the resin composition contains the following components:

(A) a polypropylene resin having a melting point of 125° C. or higher (hereinafter referred to as "resin component A"), which melting point is determined by a temperature rising analysis employing a differential scanning calorimeter (DSC) with a temperature rising rate of 10° C./min. (hereinafter referred to as "temperature rising analysis"), and (B) an ethylene-a-olefin copolymer resin of 0.94 g/cm or lower in density and 70° C. or higher in melting point measured by the temperature rising analysis using a DSC (hereinafter referred to as "resin component B"), and/or (C) a random copolymer of aromatic vinyl compound and conjugated diene compound, in which the weight ratio of aromatic vinyl compound/conjugated diene compound is 5 to 60/95 to 40 and at least 80% of conjugated diene portion is saturated with hydrogen (hereinafter referred to as "resin component C"); and the content of resin component A is 80 to 45% by weight and that of resin components B and/or C is 20 to 55% by weight.

The second aspect of the present invention relates to a laminate which is composed of a base sheet material and an embossed sheet prepared by embossing one or both surfaces of a polyolefin resin sheet made of the resin composition of 80 to 45% by weight of the resin component A and 20 to 55% by weight of the resin components B and/or C.

The third aspect of the present invention relates to a method for producing the laminate which is composed of a base sheet material and a molten sheet material composed of a resin composition of 80 to 45% by weight of the resin component A and 20 to 55% by weight of the resin components B and/or C (hereinafter referred to as "molten sheet"), which method comprises the steps of cooling and solidifying the molten sheet by means of a cooling roll having embossing patterns in its surface, which surface being disposed on the side of the molten sheet, embossing the molten sheet, and simultaneously laminating the molten sheet with the base sheet material.

The fourth aspect of the present invention relates to the above third aspect of the invention, which is characterized in co-extruding an adhesive resin on the side of the molten sheet facing the base material, and/or in the additional process to carry out surface treatment selected from corona discharge, ozonization and ultraviolet irradiation on the surface of the molten sheet facing the base material.

BRIEF DESCRIPTION OF THE DRAWINGS

These and other objects and features of the present invention will become more apparent from the following description taken in connection with the accompanying drawings, in which.

DETAILED DESCRIPTION OF THE INVENTION

Figure 1:
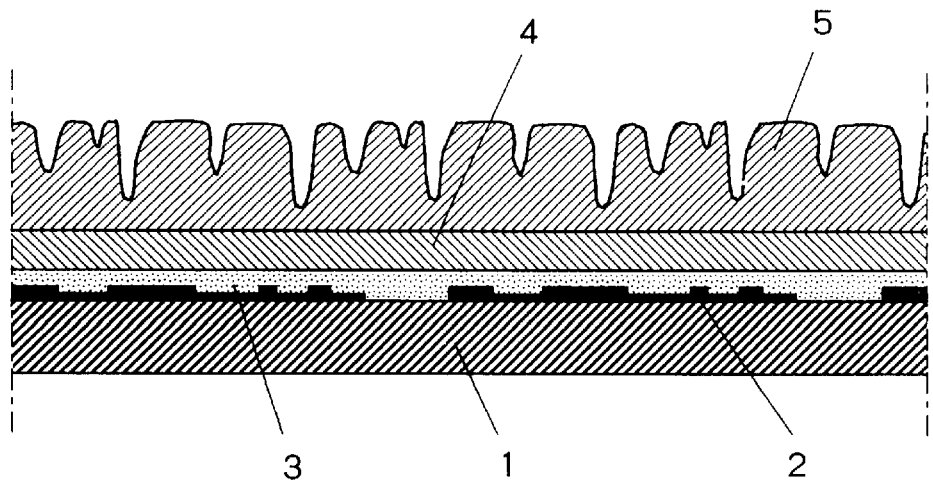
FIG. 1 is a partially cross-sectional enlarged view showing an example of the laminate prepared according to the present invention.

The components of resin composition used as the material of an embossed sheet of the present invention are described as follows.

As referred to in the foregoing paragraph, the term "resin component A" means a polypropylene resin having a melting point of 125° C. or higher by a temperature rising analysis employing a differential scanning calorimeter (DSC). This component is exemplified by homo-polypropylene, block-polypropylene, random-polypropylene, and propylene-α-olefin copolymer containing 2 to 20% by weight, preferably 3 to 15% by weight, more preferably 3 to 10% by weight of one or more α-olefins having 2 to 20 carbon atoms other than propylene such as ethylene, butene-1, 4-methylpentene-1, hexene-1 and octene-1.

The resin component A of the embossed sheet of the invention has influences mainly in the properties such as yield stress, scratch resistance (surface hardness), heat stability and the workability in embossing at high temperatures.

In order to improve these principal properties into the most well-balanced state, a random-polypropylene resin is preferred to among other resins of component A because it is excellent in compatibility with resin the resin components B and C and it also excels in transparency. Especially, those containing 2 to 10%, preferably 3 to 9%, by weight of ethylene are preferable. If the ethylene content is less than 2%, the transparency of embossed sheet is sometimes insufficient, and when the ethylene content is more than 10%, the surface tackiness occurs sometimes in embossed sheet.

The object of adding the resin components B and C in the present invention is to improve several properties which are unsatisfactory in the product made of only the resin component A, such as the properties of softness, transparency, touch feeling, external feeling, and the whitening resistance when it is given a shock or when it is folded at acute angles during the secondary processing, with retaining the advantageous properties of the resin component A, and also to improve the embossing property by controlling the solidifying speed in processing and the stability of molten composition.

In the following, both the resin components B and C will be described.

The resin component B used in the present invention is an ethylene-a-olefin copolymer of 0.94 g/cm$^3$ or lower in density and 70° C. or higher in melting point which is determined by the temperature rising analysis with a DSC.

As the α-olefins, those having carbon atoms of 3 to 20 are used. Preferably, propylene, butene-1, 4-methylpentene-1, hexene-1, octene-1 and the like are exemplified, and especially butene-1 is preferable.

The resin component B is so excellent in softness, and also in compatibility with the resin component A that it can be dispersed finely into resin component A without lowering its transparency. Moreover, because the resin component B contains crystalline components of relatively high melting points, its workability in embossing (the easiness in embossing patterns and the retention of patterns in high temperature conditions) is also excellent.

It is preferable that the ethylene-α-olefin copolymer resin contains 5 to 40% by weight of α-olefin, and particularly has a melting point of 105° C. or higher by the temperature rising analysis with a DSC. Moreover, the density is in the range of 0.86 to 0.94 g/cm$^3$, preferably 0.88 to 0.93 g/cm and more preferably 0.89 to 9.92 g/cm$^3$.

The resin component C used in the present invention is a random copolymer of aromatic vinyl compound and conjugated diene compound, wherein the weight ratio of aromatic vinyl compound/conjugated diene compound is 5 to 60/95 to 40 and at least 80% of conjugated diene portion is saturated with hydrogen. Because the resin component C does not contain crystalline components having distinct melting points, it is impossible to expect the similar effect as that of the resin component B on the properties related to heat stability. However, since it disperses finely into the resin component A to reduce the size of spherulites, it produces a desirable effect in the pattern formation during the embossing. Moreover, because it can improve the transparency and the resistance to whitening with the addition of a relatively small amount, it is useful in keeping proper balances among the properties of the final composition.

As the above-mentioned aromatic vinyl compounds, styrene, α-methylstyrene, p-methylstyrene, m-methylstyrene, o-methylstyrene, p-tert-butylstyrene, dimethylstyrene, and vinylnaphthalene can be used, in which the compound consisting mainly of styrene is particularly preferable.

As the conjugated diene compounds, butadiene, isoprene, piperylene and the like can be used, and the diene compounds consisting mainly of butadienes, particularly 1,3-butadiene are preferable.

Though the weight ratios of the aromatic vinyl compound and the conjugated diene compound are in the value mentioned above, the, amount of conjugated diene compound is preferably greater. Particularly, the weight ratio of aromatic vinyl compound/conjugated diene compound is 20 to 40/80 to 60.

It is necessary that at least 80%, preferably 90%, or more of conjugated diene portion is saturated with hydrogen. This saturation improves the thermal stability, weather resistance, and the compatibility with resin components A and B.

These resin components B and C may be used singly or used together.

The weight ratio of resin component A and resin components B and/or C may be decided arbitrarily depending on the use of the embossed sheet. However, in order to obtain the effect of the invention, the resin component A in the range of 80 to 45% by weight and the resin components B and/or C in the range of 20 to 55% by weight are used. It is preferable to select the resin component A from the range of 75 to 50% by weight and the resin components B and/or C of 25 to 50% by weight.

The above-mentioned limitation on compounding ratios are considered as follows.

In the first place, when the content of resin component A is less than 45%, the amount of crystalline component having melting point of 125° C. or above is too small, so that it takes long time to solidify the fused composition and problems are caused to occur in the formation of patterns in embossing operation and durability of embossed patterns of formed products at high temperatures. Moreover, because the amount of resin components B and/or C is relatively increased, the surface tackiness is caused to occur.

On the other hand, when the content of resin component A is more than 80%, the apparent viscosity of molten composition largely depends upon the shear rate, so that the molten composition becomes unstable. In addition, the molten composition solidifies rapidly, so that the formation of embossed pattern is impeded. Moreover, the amounts of resin components B and/or C are relatively decreased, so that the softness and transparency are impaired.

In solving the problems in relation to the embossed sheet, i.e., (1) thermal stability, (2) easiness in embossing, (3) resistance to whitening and (4) excellence in transparency, the resin component B is effective on all aspects. As compared with the resin component B, the resin component C is less effective in the problem (1), however, it is more effective in view of the problems (2) to (4). In many cases of practical compounding, the embossed sheet having an excellent balance among its characteristic properties is obtained by using a larger amount of resin component B than that of resin component C.

According to the investigation of the present inventors, when both the resin components B and C are used, the best effects are obtained with 95 to 60% by weight of the resin component B and 5 to 40% by weight of the resin component C, preferably with 85 to 70% by weight of the resin component B and 15 to 30% by weight of the resin component C.

Incidentally, in the present invention, in addition to the resin components A, B and C, modifiers usually used for softening polypropylene resin may be added unless they impair the object of the invention. These modifiers are exemplified by ethylene-α-olefin copolymer, ethylene-propylene copolymer rubber and ethylene-propylene non-conjugated diene copolymer rubber. Moreover, in view of the use of the embossed sheet, additives such as antioxidant (e.g. phenol compounds, phosphorus compounds, and sulfur compounds), weather-proofing agent (e.g. hindered amine compounds), lubricant (e.g. higher fatty acid amides, fluorocarbon resins, and metallic soaps), antiblocking agent (e.g. silicates and carbonates) may be added. Furthermore, in order to obtain more agreeable appearance, a small quantity of organic or inorganic pigment can be added unless they impair the object of the present invention.

For producing the embossed sheet of the resin composition obtained as above, known embossing rolls and the like are utilized. The embossing operation may be applied to one surface of the sheet or to both surfaces.

An embossed sheet of the invention is used for the purposes in which superior performances are required such as weather resistance, thermal stability and softness, and also transparency, agreeable appearance, good touch feeling and the like. For example, packaging materials, industrial receptacles, containers for cosmetics and foods, stationery, toys, videocassette cases, decorative films and the like are exemplified.

The second aspect of the present invention relates to a laminate prepared by laminating the embossed sheet with a suitable base materials.

The kind of base material used in the invention is not limited. More particularly, it is exemplified by paper, synthetic resin, rubber, wood, ceramic, glass, and metal. These are used as products of various forms such as films, sheets, plates and hollow articles. For example, they are exemplified by a synthetic resin film or sheet, foamed film or sheet, porous film, rubber sheet, woven fabric, nonwoven fabric, metal foil, and glass plate.

As papers, there are kraft paper, Japanese paper, glassine paper, paperboard and the like, and they can be used with or without printing.

The synthetic film or sheet is exemplified by polyolefins such as polyethylene and polypropylene, polystyrenes, polyesters, polyamides, saponified ethylene-vinyl acetate copolymer, polyvinyl alcohol, polyvinyl chloride, polyvinylidene chloride, polycarbonate, acrylic resins are exemplified. Among them, the polyolefins are most suitable for wide uses in view of the adhesive property and economy.

Foamed film and sheet are not restricted to any of specific ones. However, generally preferable ones are thermoplastic resins including polyolefins such as polyethylene and polypropylene, polystyrene, polyesters, polyamides and the like. Among them, polyolefins are preferable in view of economy, thermal stability, mechanical strength and the like.

Porous film is made of polyolefins such as polyethylene and polypropylene, polystyrene, polyesters, polyamides, saponified ethylene-vinyl acetate copolymer, polyvinyl chloride, polyvinylidene chloride, polycarbonate and the like. Particularly, the porous film comprising poly-olefins is preferable in view of the economy, thermal stability, and mechanical strength. The porous film is produced suitably by mixing filler or the like into the resin, forming into film and then orienting it, or by extracting the filler with a solvent, and there are no limitations on the method.

The rubber sheet is exemplified by those made of ethylene-propylene copolymer rubber, ethylene-propylene-diene copolymer rubber, styrene-butadiene copolymer, acrylonitrile-styrene copolymer rubber, SIS (styrene-isoprene-styrene block copolymer), SBS (styrene-butadiene-styrene block copolymer), and polyurethane.

As the nonwoven fabrics, there are random nonwoven fabrics which are prepared by accumulating multifilament or staple fibers, nonwoven fabrics which are prepared by splitting stretched films and then laminating crosswise, and nonwoven fabrics which are prepared by laminating flat yarns crosswise.

As the woven fabrics, there are organic fabrics and inorganic fabrics composed of flat yarns or multifilaments made from synthetic resin, natural fiber, synthetic fiber, glass fiber, carbon fiber and the like.

As the metal foil, foils made of aluminum, iron, nickel, gold, and silver are exemplified. Among them, the aluminum foil is particularly preferable in view of economy and several physical properties.

In the process of forming a laminate with the embossed sheet and the base material, it is possible to give various characteristics to the product by selecting a base material. For example, a product which is excellent in flame resistance is prepared by using a flame-resistant base material, and a product excellent in sound insulation and heat insulation is produced by using a soft foamed base material.

Further, a product having agreeable appearance is obtained by using a base material with any printed patterns. The first merit of an embossed sheet of the invention having particularly excellent transparency is that it functions as a protective layer for the printed layer. In other words, it acts as a protective layer against physically damaging factors and chemically deteriorating factors without impairing agreeable appearance, and also well functions as a protective layer against deteriorating factors such as ultraviolet rays by adding proper additives. As the second merit, it can give an excellent appearance to the product. In other words, the pattern on a printed layer is observed by users through the embossed pattern given on the embossed sheet, so that it can give an excellent appearance.

To join an embossed sheet to a base material, the embossed sheet is generally laminated over the base material before being cooled. In this case, it is preferable, if necessary, to apply an adhesive or the like to the base material and/or the embossed sheet, or to laminate adhesive resin. For applying the adhesive, a roll coater or the like is used, and for laminating the adhesive resin, a T-die for multi-layer extruding is used.

After that, cooling is carried out by air cooling or water cooling, or with a cooling roll. In this case, it is desirable to carry out the quality control by measuring the thickness of the sheet with using β ray.

The embossed sheet and the laminate containing the embossed sheet of the invention can be produced by the well known methods such as wet laminating and dry laminating.

Furthermore, it is possible to improve abrasion resistance by coating the surface with silicone resin, polyurethane or the like.

The laminate is suited to the use in the field necessitating superior performance in weatherability, heat stability and softness, and also excellency in transparency, agreeable appearance, touch feeling and the like. For example, it is used as surface coating material of industrial receptacles in general, food containers, cosmetics containers and the like; as the exterior material of stationery, toys, furniture, audio cases and the like; and as decorative board for doors and the like.

Incidentally, in producing the laminate of the invention, it is possible to produce largest effects of an embossed sheet of the present invention by employing the following method.

In the following passages, the method for producing a laminate of the invention will be described in detail with reference to the accompanying drawings.

FIG. 1 is a partially cross-sectional enlarged view showing an example of the laminate of the present invention. That is, the laminate is prepared by printing patterns 2 on the upper surface of a base material sheet 1, applying an adhesive 3 on that, and laminating an embossed sheet 5 with interposing a layer of adhesive resin 4.

Figure 2:
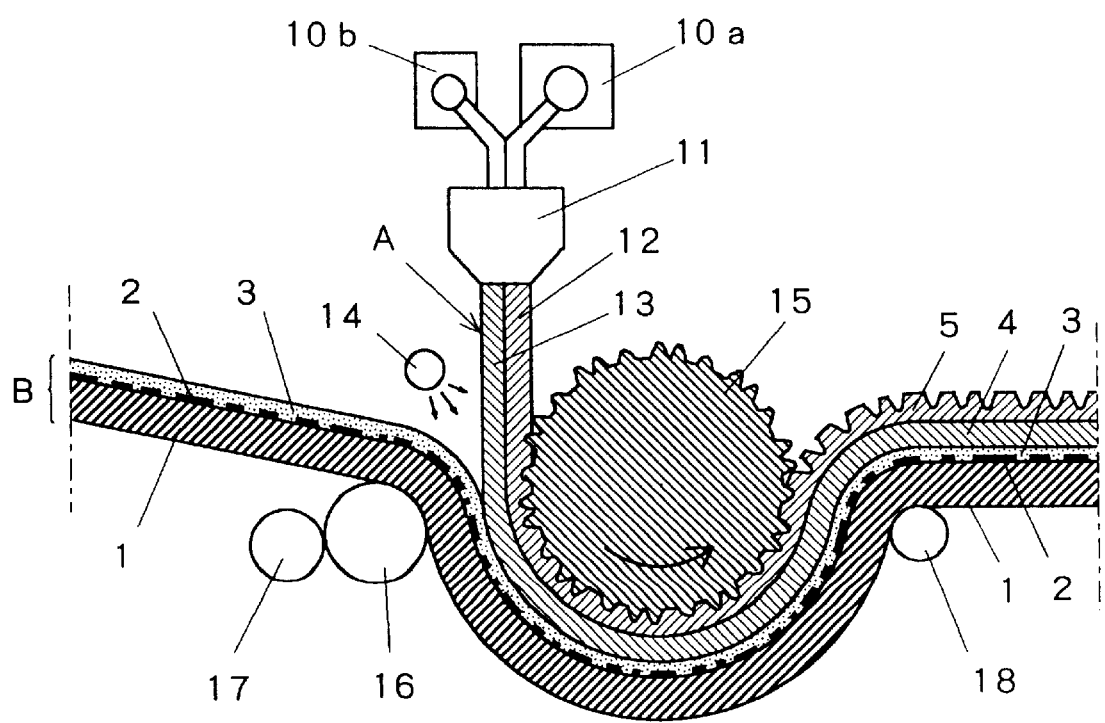
FIG. 2 is a schematic cross-sectional view showing an example of the apparatus for producing the laminate of the present invention.

FIG. 2 is a schematic cross-sectional view showing an example of the apparatus for producing the laminate of the present invention.

Firstly, a base material layer B is prepared by applying an adhesive 3, as occasion demands, on a base material sheet 1 which is printed with patterns 2 in advance. Meanwhile, a resin composition and adhesive resin are supplied to a T-die 11 by extruders 10a, 10b, and formed by co-extruding into a molten sheet layer A comprising a molten sheet 12 and a molten adhesive resin sheet 13. Ozone gas is blown from an ozonizer 14 against both the adhesion surfaces of the molten adhesive resin sheet 13 of the molten sheet layer A and the adhesive 3 of the base material sheet B to activate the adhesion surfaces by oxidation. Then these materials are inserted between an embossing/cooling roll 15 having embossing patterns and a pressure roll 16. The molten sheet layer A and the base material sheet B are joined together, while the molten sheet 12 is embossed, and these are transferred in contact with the outer surface of the embossing/cooling roll 15, solidified by cooling, and peeled off by a peeling roll 18 to obtain the laminate having the layer structure shown in FIG. 1. Incidentally, symbol 17 denotes a backup roll for the pressure roll 16.

According to the above preparation method, because the embossing and the solidifying by cooling are carried out during the lamination, the molten resin is placed in a state like in a mold. Therefore, excellent embossing operation is attained, so that embossing with fine patterns such as the formation of a hologram can be carried out without any problem. Furthermore, owing to the immediate completion of cooling and solidifying, products with good heat stability are obtained. Still further, owing to the simultaneous laminating, there is no need to worry about the occurrence of bubbles in the adhesion surfaces to impair agreeable appearance, and also sufficient adhesive strength is attained.

As for the laminate of the present invention, in the case that more large bonding strength between layers is required depending on the purpose of use, it is preferable, as mentioned above, to apply the adhesive 3 on the base material sheet 1, to co-extrude adhesive resin 4 on the side of the embossed sheet 5 facing the base material, or to carry out the surface processing such as ozonization or ultraviolet-ray treatment on the adhesion surfaces of the laminate.

As the adhesive 3, the conventional ones used for polyolefins, such as urethanes, polyesters and water acrylic emulsions can be employed without any limitations. Considering the combination with printing ink, the urethane adhesive is most suitable. The method for applying the adhesive can also be carried out conventionally, and there is no limitation. If the amount of adhesive is too much, whitening is liable to occur when the laminated sheet is bent. Therefore, the appropriate thickness is in the range of 1 to 10 μm.

As the adhesive resin 4, the conventional ones used for polyolefins are used without any limitation likewise in the foregoing adhesive 3. The film thickness ratio of embossed sheet:adhesive resin of the invention can be in the range of 60:40 to 95:5, preferably 80:20 to 95:5.

As the ozonizer 14, commonly known apparatus can be used without any restrictions. In connection with flow rate of ozone, there are a method of low concentration at a high flow rate and a method of high concentration at a low flow rate. It is difficult to discuss merits and demerits of them. However, when the flow rate is too high, the bad influences such as film vibration and temperature lowering of molten resin are sometimes caused to occur, so that the ozone concentration of 20 to 50 g/Nm and the air flow rate of 1 to 10 Nm$^3$/hr are suitable.

BEST MODE FOR CARRYING OUT THE INVENTION

An embossed sheet which is excellent in embossing workability, whitening resistance and transparency, is obtained by using the resin composition containing specific ratios of (A) polypropylene having a melting point of 125° C. or higher, (B) ethylene-a-olefin copolymer having specific properties and (C) aromatic vinyl compound-conjugated diene random copolymer having specific properties.

Furthermore, a laminate which has good appearance and excellent bonding strength is obtained by laminating the above resin composition and a base material through the extrusion of the resin composition, and then subjecting the obtained laminate to embossing step and solidifying it by cooling.

In the following, the invention will be described in more detail with reference to examples. However, the present invention is not restricted to them. In the first place, testing methods will be described.

<Testing Method>

(a) Transparency

The embossed sheet made of each resin composition were tested concerning the following items.

(1) Haze of transparent part (JIS K 7105)

(2) Unevenness of transparency in the whole sheet with the naked eye

The results of overall (relative) evaluation were indicated with the following 4 grades.

| A: Very good | B: Good |
|---|---|
| C: Average | D: Inferior |

(b) Whitening Resistance

Using the apparatus as defined in ASTM D 1593-81 "Spec. for Nonrigid Vinyl Chloride Plastic Sheeting", an embossed sheet was bent in an environment of 5° C., and the state of whitening was evaluated with the following 3 grades.

A: No whitening was observed
B: Slight whitening was observed
C: Apparent whitening was observed (c) Workability in Embossing Tests were done in the following items.

(1) Comparison between the depth of the embossing die and that of an embossed sheet (2) Uniformity of embossed patterns in whole sheet (3) Evenness between longitudinal embossed grooves and transverse embossed grooves (4) Evenness of embossed patterns after being soaked in glycerin at 130° C. for 30 sec.

The results of overall (relative) evaluation were indicated according to the following 4 grades.

| A: Very good | B: Good |
|---|---|
| C: Average | D: Inferior |

The resin components used in examples and comparative examples are indicated with the following symbols:

(Resin Component A)

A-1: Polypropylene
  Ethylene content (NMR method): 3% by weight
  MFR=1.5 g/10 min. (230° C./2.16 kg load)
  Melting point=148° C.

A-2: Polypropylene
  Ethylene content (NMR method): 9% by weight
  MFR=10 g/10 min. (230° C./2.16 kg load)
  Melting point=135° C.

A-3: Polypropylene
  Ethylene content (NMR method): less than 1% by weight
  MFR=8 g/10 min. (230° C./2.16 kg load)
  Melting point=161° C.

(Resin Component B)

B-1: Polyethylene
  Butene-1 content (NMR method): 14% by weight
  MFR=2 g/10 min. (190° C./2.16 kg load)
  Density=0.905 g/cm , Melting point=115° C.

B-2: Polyethylene
  Butene-1 content (NMR method): 24% by weight
  MFR=20 g/10 min. (190° C./2.16 kg load)
  Density=0.890 g/cm$^3$, Melting point=85° C.

(Resin Component C)

C-1: Styrene-butadiene random copolymer
  Styrene content: 10% by weight
  Saturation rate with hydrogen: 90% or more
  MFR=8 g/10 min. (230° C./2.16 kg load)

Furthermore, in order to confirm the effects of resin components B and C, comparative experiments were carried out with using the following components:

D-1: Polyethylene
  Butene-1 content (NMR method): 6% by weight
  MFR=2 g/10 min. (190° C./2.16 kg load)
  Density=0.925 g/cm$^3$, Melting point=125° C.

D-2: Styrene-butadiene block copolymer
  Styrene content: 30% by weight
  Saturation rate with hydrogen: 90% or more
  MFR=5 g/10 min. (230° C./2.16 kg load)

EXAMPLES 1 TO 10, AND COMPARATIVE EXAMPLES 1 TO 6

Resin components A, B and C were blended according to the compounding ratios shown in Table 1 and 2, and to 100 parts by weight of the total resin, 0.1 parts by weight of phosphorus antioxidants and 0.1 parts by weight of phenol antioxidants were added. They were mixed together with a Henschel mixer and further mixed in molten state with a continuous twin-screw extruder to obtain resin compositions.

The above resin composition was fed to an extruder (40 mmφ, L/D=22; full-flighted screw), extruded through a hanger coat die of 600 mm in width which was installed at the head of the extruder, and then embossed with an embossing roll to obtain a transparent embossed sheet. The operation conditions were as follows:

Cylinder temperature: 230° C.
Die temperature: 230° C.
Lip gap: 0.8 mm
Air gap distance: 100 mm
Embossing roll: 400 mmφ, 30° C.
Thickness of embossed sheet: 100 μm and 150 μm The transparency, whitening resistance and workability in embossing of each of the obtained embossed sheets were measured, which results are shown in Table 3 and 4.

TABLE 1

Resin Compositions in Examples

| Resin Composition | | 1 | 2 | 3 | 4 | 5 |
|---|---|---|---|---|---|---|
| Component A | Resin | A-1 | A-1 | A-2 | A-2 | A-3 |
|  | wt % | 60 | 60 | 60 | 70 | 50 |
| Component B | Resin | B-1 | B-1 | B-1 | B-1 | B-2 |
|  | wt % | 40 | 32 | 40 | 24 | 30 |
| Component C | Resin | — | C-1 | — | C-1 | C-1 |
|  | wt % | — | 8 | — | 6 | 20 |
| Weight ratio of Comp. B/Comp. C | | 100/0 | 80/20 | 100/0 | 80/20 | 60/40 |

| Resin Composition | | 6 | 7 | 8 | 9 | 10 |
|---|---|---|---|---|---|---|
| Component A | Resin | A-1 | A-2 | A-1 | A-1 | A-2 |
|  | wt % | 70 | 80 | 60 | 60 | 70 |
| Component B | Resin | B-1 B-2 | — | B-1 | B-2 | B-2 |
|  | wt % | 14  10 | — | 20 | 38 | 24 |
| Component C | Resin | C-1 | C-1 | C-1 | C-1 | C-1 |
|  | wt % | 6 | 20 | 20 | 2 | 6 |
| Weight ratio of Comp. B/Comp. C | | 80/20 | 0/100 | 50/50 | 95/5 | 80/20 |

TABLE 2

Resin Compositions in Comparative Examples

| Resin Composition | | 11 | 12 | 13 | 14 | 15 | 16 |
|---|---|---|---|---|---|---|---|
| Component A | Resin | A-1 | A-1 | A-2 | A-2 | A-3 | A-2 |
|  | wt % | 85 | 85 | 60 | 30 | 30 | 80 |
| Component B | Resin | B-1 | B-1 | — | B-1 | B-2 | — |
|  | wt % | 15 | 10 | — | 56 | 35 | — |
| Component D | Resin | — | — | D-1 | — | — | — |
|  | wt % | — | — | 40 | — | — | — |
| Component C | Resin | — | C-1 | — | C-1 | C-1 | — |
|  | wt % | — | 5 | — | 14 | 35 | — |
| Component D | Resin | — | — | — | — | — | D-2 |
|  | wt % | — | — | — | — | — | 20 |
| Weight ratio of Comp. B(D)/ Comp. C(D) | | 100/0 | 67/33 | 100/0 | 80/20 | 50/50 | 0/100 |

TABLE 3

Embossed Sheets of Examples

| Example | 1 | 2 | 3 | 4 | 5 | 6 | 7 | 8 | 9 | 10 |
|---|---|---|---|---|---|---|---|---|---|---|
| No. of Resin Composition | 1 | 2 | 3 | 4 | 5 | 6 | 7 | 8 | 9 | 10 |
| Transparency | B | A | A | A | A | A | A | A | A | A |
| Whitening Resistance | B | A | B | A | A | A | B | A | B | A |
| Embossing Property | A | A | A | A | A | A | B | B | A | B |

TABLE 4

Embossed Sheets of Comparative Examples

| Comparative Example | 1 | 2 | 3 | 4 | 5 | 6 |
|---|---|---|---|---|---|---|
| No. of Resin Composition | 11 | 12 | 13 | 14 | 15 | 16 |
| Transparency | C | B | C | A | A | B |
| Whitening Resistance | C | B | C | A | A | B |
| Embossing Property | C | C | B | D | D | C |

(Results of Examples)

In all examples, desirable results were obtained.

In Example 1, the resin component C was not contained. However, because it satisfied the requisite for the compounding ratio of the invention (claim 1), it gave desirable results.

Example 2 contained both the resin components B and C, and also satisfied the requisites for the compounding ratios of the invention (claim 1 and 2) to give the most desirable results.

Example 3 did not contain the resin component C, nevertheless satisfies the requisite for the compounding ratio of the invention (claim 1) to give the desirable results. As compared to Example 1, the transparency was improved, which result was considered to be due to the difference of ethylene contents of resin component A.

All of Examples 4, 5 and 6 contained the resin components B and C, and also satisfied the requisites for the compounding ratios of the invention (claim 1 and 2) to give the most desirable results.

Example 7 did not contain the resin component B, nevertheless it satisfied the requisite for the compounding ratio of the invention (claim 1) to give the desirable results. As compared to Example 1, the transparency was improved and the embossing workability was inferior, which results were assumed to be due to the difference of improving effects given by the resin components B and C.

Both Examples 8 and 9 contained resin components B and C, in which more desirable results were obtained than those of Examples 1 or 7 which contained either the resin component B or C.

Example 10 contained resin components B and C. As compared with Example 4, it is considered that the effect in this mixture was produced due to the difference in the density of the resin component B.

(Results of Comparative examples)

Comparative Example 1 neither contained the resin component C nor satisfied the requisite for the compounding ratio of the invention (claim 1), so that the desirable results could not be obtained.

Comparative Example 2 contained the resin components B and C, and also satisfied the requisite for the compounding ratio of the invention (claim 2). However, it did not satisfy the requisite for the weight ratio of resin component A and the total amount of resin components B and C of the invention (claim 1), so that desirable results could not be obtained.

Comparative Example 3 contained, instead of the resin component B, ethylene-α-olefin copolymer (D-1) which did not satisfy the requisite for the resin component B. Although it satisfied the requisite for the compounding ratio of the invention (claim 1), it did not give desirable results.

Comparative Example 4 contained resin components B and C, and also satisfied the requisite for the compounding ratio of the invention (claim 2). However, it did not satisfy the requisite for the weight ratio of resin component A and the total amount of resin components B and C of the invention (claim 1), so that desirable results could not be obtained.

Comparative Example 5 contained the resin components B and C, but did not satisfy the requisite for the compounding ratios of the invention (claim 2). Furthermore, it did not satisfy the requisite for the weight ratio of resin component A and the total amount of resin components B and C of the invention (claim 1), so that desirable results could not be obtained.

Comparative Example 6 contained, instead of styrene-butadiene random copolymer as the resin component C, styrene-butadiene block copolymer (D-2). Although it satisfied the requisite for the compounding ratio of the invention (claim 1), it did not give desirable results.

EXAMPLE 11 TO 20, COMPARATIVE EXAMPLE 7 TO 12

Each of the above-mentioned resin compositions 1 to 16 and an adhesive resin consisting of polyolefin modified with maleic anhydride (trade name:NISSEKI N-Polymer L6032) were supplied to a two-layer T-die extruder to produce two-layer sheets. The thicknesses of the layers of resin composition and adhesive resin were 120 μm and 30 μm, respectively. On each of the obtained sheets, a polyamide sheet printed with patterns of wood grain was superimposed as a base material sheet, and these were passed between steel belts regulated at 230° C. and pressed in a hot state to form a laminate.

Incidentally, the steel belt in contact with the side of resin composition of the above laminate was equipped with embossing die of bark-like patterns to emboss the resin composition with the patterns.

With the laminates obtained as the above, overall (relative) evaluation on agreeable appearance was carried out on by using an analogous material made of conventional polyvinyl chloride as a standard. The evaluation was indicated according to the following 4 grades, which results are shown in the following Table 5 and 6.

| A: Very good | B: Good |
|---|---|
| C: Average | D: Inferior |

TABLE 5

Laminates of Examples

| Example | 11 | 12 | 13 | 14 | 15 | 16 | 17 | 18 | 19 | 20 |
|---|---|---|---|---|---|---|---|---|---|---|
| No. of Resin Composition | 1 | 2 | 3 | 4 | 5 | 6 | 7 | 8 | 9 | 10 |
| Agreeable Appearance | A | A | A | A | A | A | B | B | A | B |

TABLE 6

Laminates of Comparative Examples

| Comparative Example | 7 | 8 | 9 | 10 | 11 | 12 |
|---|---|---|---|---|---|---|
| No. of Resin Composition | 11 | 12 | 13 | 14 | 15 | 16 |
| Agreeable Appearance | C | C | B | D | D | C |

EXAMPLES 21 TO 30, COMPARATIVE EXAMPLES 13 TO 18

Each of the above-mentioned resin compositions 1 to 16 and a commercially available adhesive resin of polyolefin modified with maleic anhydride (trade name: NISSEKI N-Polymer L6032) were supplied to a two-layer T-die extruder to produce two-layer sheets. The thickness of the layer of resin composition was 120 μm, and that of adhesive resin was 30 μm.

As a base material sheet, a polypropylene sheet printed with a wood grain pattern and applied with an adhesive, was superimposed on the above sheet, while the ozone gas activation processing was carried out on the adhesion surfaces as shown in FIG. 2. These were then rolled over an embossing/cooling roll having a surface temperature of 20° C. and pressed in a hot state to form a laminate.

With the laminates obtained as the above, the agreeable appearance was evaluated, in the like manner as in Example 11 to 20 and Comparative Example 7 to 12, which results are shown in the following Table 7 and 8.

TABLE 7

Laminates of Examples

| Example | 21 | 22 | 23 | 24 | 25 | 26 | 27 | 28 | 29 | 30 |
|---|---|---|---|---|---|---|---|---|---|---|
| No. of Resin Composition | 1 | 2 | 3 | 4 | 5 | 6 | 7 | 8 | 9 | 10 |
| Agreeable Appearance | A | A | A | A | A | A | A | A | A | A |

TABLE 8

Laminates of Comparative Examples

| Comparative Example | 13 | 14 | 15 | 16 | 17 | 18 |
|---|---|---|---|---|---|---|
| No. of Resin Composition | 11 | 12 | 13 | 14 | 15 | 16 |
| Agreeable Appearance | B | B | B | C | C | C |

As described above, according to the present invention, the polyvinyl chloride is not used, so that environmental pollution does not caused to occur and it is possible to provide embossed sheets having desirable properties which are equal to or higher than those of polyvinyl chloride.

Furthermore, it is possible to fuse and extrude polyolefin resin, to laminate it with another base material, and to carry out embossing and solidifying by cooling simultaneously, so that the loss of energy is small, and also the obtained laminates are excellent in reproducibility of embossing, thermal stability and bonding strength.

What is claimed is:

1. A laminate consisting essentially of of a base material and an embossed sheet prepared by embossing one or both surfaces thereof, said sheet made of a resin composition which comprises:

(A) a polypropylene resin having a melting point of at least 125° C., which melting point is determined by temperature rising analysis employing a differential scanning calorimeter having a temperature rising rate of 10° C./min.; and (B) a resin component selected from the group consisting of an ethylene-α-olefin copolymer resin having a density of no more than 0.94 g/cm$^3$ and a melting point of at least 70° C. as determined by temperature rising analysis employing a differential scanning calorimeter, a random copolymer of an aromatic vinyl compound and a conjugated diene compound wherein the weight ratio of said aromatic vinyl compound to said conjugated diene compound is in the range of between 5:95 and 60:40 wherein at least 80% of said conjugated diene is saturated with hydrogen and mixtures thereof;

wherein said component A is 45% to 80% by weight and said component B is 20% to 55% by weight, based on the total weight of said resin composition.

2. The laminate as claimed in claim 1, wherein said laminate is a decorative sheet containing at least a transparent embossed sheet and a printed sheet.

3. The laminate as claimed in claim 1, wherein said resin component A is a block copolymer or a random copolymer of propylene and another α-olefin.

4. The laminate as claimed in claim 3 wherein said α-olefin contains 2 to 20 carbon atoms and represents 2% to 20% by weight of said block or said random copolymer.

5. The laminate as claimed in claim 4 wherein said component A is a propylene-ethylene random copolymer containing 2% to 10% by weight ethylene.

6. The laminate as claimed in claim 1 wherein said ethylene-α-olefin copolymer has a density of 0.89 to 0.92 g/cm$^3$.

7. The laminate as claimed in claim 6 wherein said ethylene-α-olefin copolymer is 5% to 40% by weight α-olefin and has a melting point of at least 105° C. as determined by temperature rising analysis employing a differential scanning calorimeter.

8. The laminate as claimed in claim 1 wherein said random copolymer of said aromatic vinyl compound and said conjugate diene compound comprises a styrene-butadiene copolymer.

9. The laminate as claimed in claim 1 wherein said resin component B is a mixture of said ethylene-α-olefin copolymer and said random copolymer of an aromatic vinyl compound and a conjugated diene compound and wherein the weight ratio of said ethylene-α-olefin copolymer to said random copolymer of an aromatic vinyl compound and a conjugated diene compound is in the range of between 95:5 and 60:40.

10. The laminate as claimed in claim 1 wherein said ethylene-α-olefin copolymer is a copolymer of ethylene-butene-1.

* * * * *